United States Patent
Casey

[11] 3,756,102
[45] Sept. 4, 1973

[54] ADJUSTABLE CENTER APPARATUS
[76] Inventor: Morris Dick Casey, c/o Casey Tool & Die Co., M-40 South, Dowagiac, Mich.
[22] Filed: Apr. 22, 1971
[21] Appl. No.: 136,384

Related U.S. Application Data
[63] Continuation-in-part of Ser. No. 20,492, March 18, 1970, abandoned.

[52] U.S. Cl. .................. 82/40 R, 82/33 R, 82/45 R
[51] Int. Cl... B23b 33/00, B23b 23/02, B23b 23/04
[58] Field of Search ................... 82/33 R, 33 A, 40, 82/45

[56] References Cited
UNITED STATES PATENTS

| | | | |
|---|---|---|---|
| 3,308,696 | 3/1967 | La Marca | 82/33 |
| 3,315,551 | 4/1967 | La Marca | 82/45 |
| 3,057,237 | 10/1962 | Becker | 82/33 |
| 2,131,327 | 9/1938 | Lippard | 82/33 A |
| 2,247,721 | 7/1941 | Wright | 82/33 |
| 2,116,135 | 5/1938 | Bath | 82/40 |
| 1,440,189 | 12/1922 | Turner | 82/33 |
| 2,547,858 | 4/1951 | Dearborn | 82/33 |
| 3,120,776 | 2/1964 | De Bruin | 82/33 |

*Primary Examiner*—Harrison L. Hinson
*Attorney*—Olson, Trexler, Wolters & Bushnell

[57] ABSTRACT

Adjustable live or dead center apparatus adapted for use in rotatably supporting a workpiece to be turned during lathe operations and further adapted for accurate correction of lathe center and/or piece part misalignment which is likely to occur with respect to a mounted workpiece having its surfaces eccentric relative to the centers thereof. The center apparatus employs a center arrangement or assembly including a nose portion which is mounted for limited movement transversely of the longitudinal axis of a lathe spindle. A plurality of selectively operable adjustment means are utilized which, when operated, are effective to alter the position of the nose portion of the center arrangement with respect to the longitudinal axis of said spindle.

12 Claims, 10 Drawing Figures

Patented Sept. 4, 1973
3,756,102
2 Sheets-Sheet 1
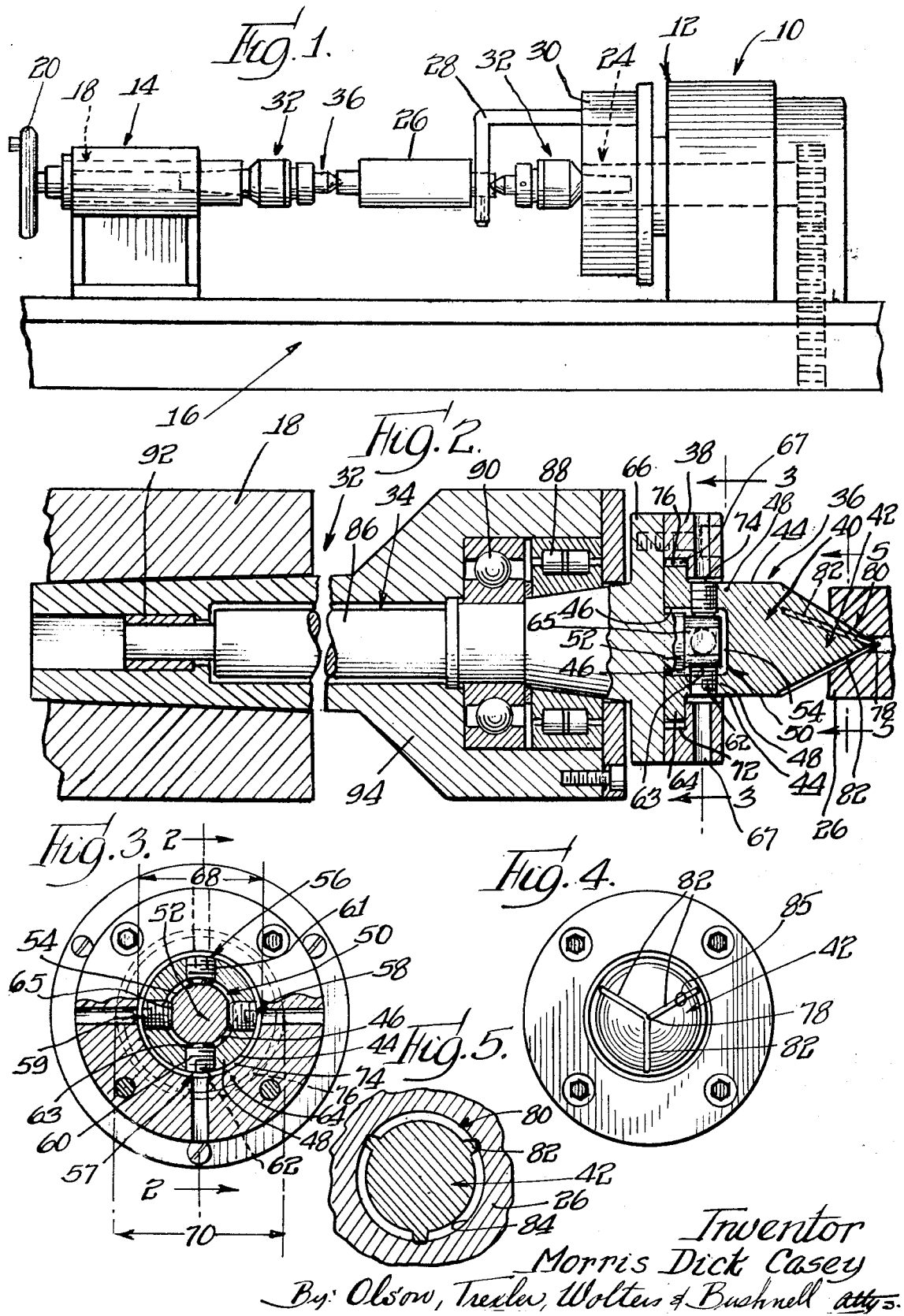
Inventor
Morris Dick Casey
By: Olson, Trexler, Wolters & Bushnell Attys.

Patented Sept. 4, 1973 3,756,102
2 Sheets-Sheet 2
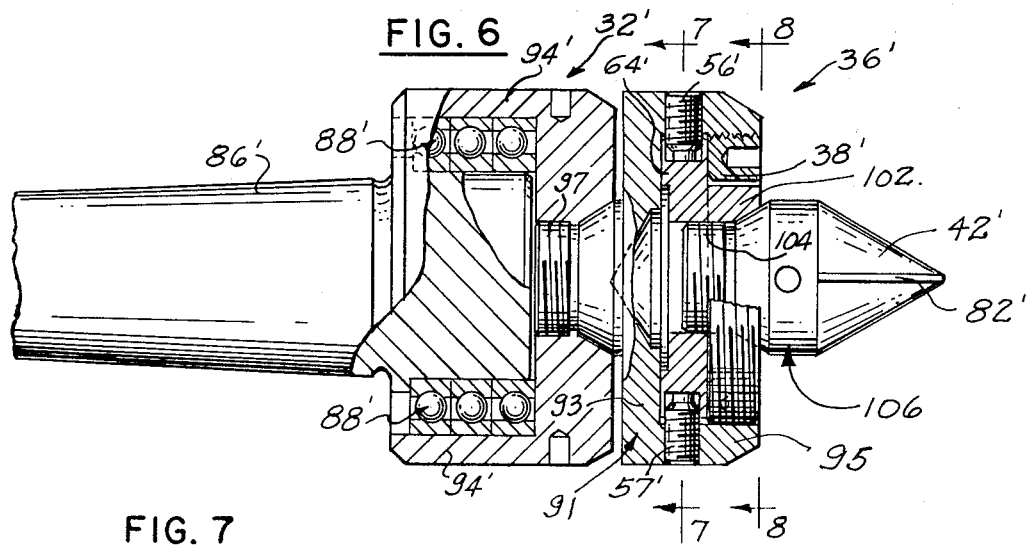
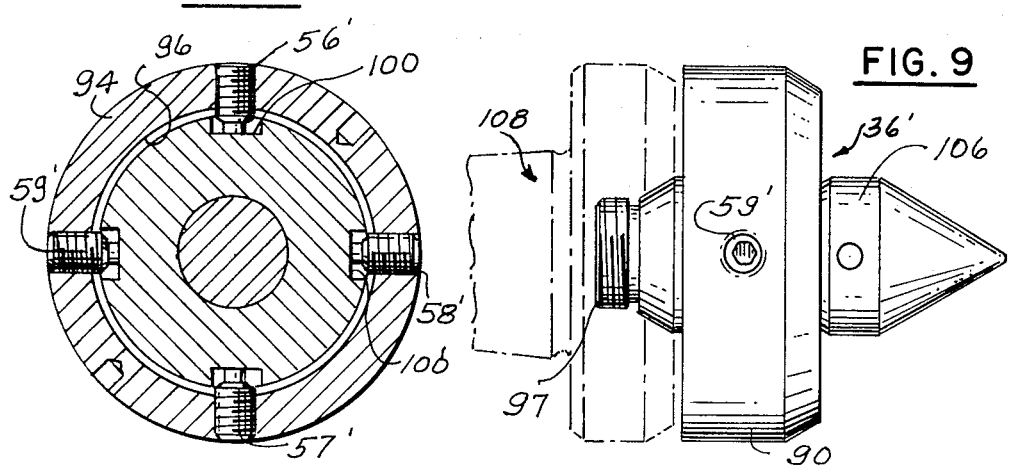
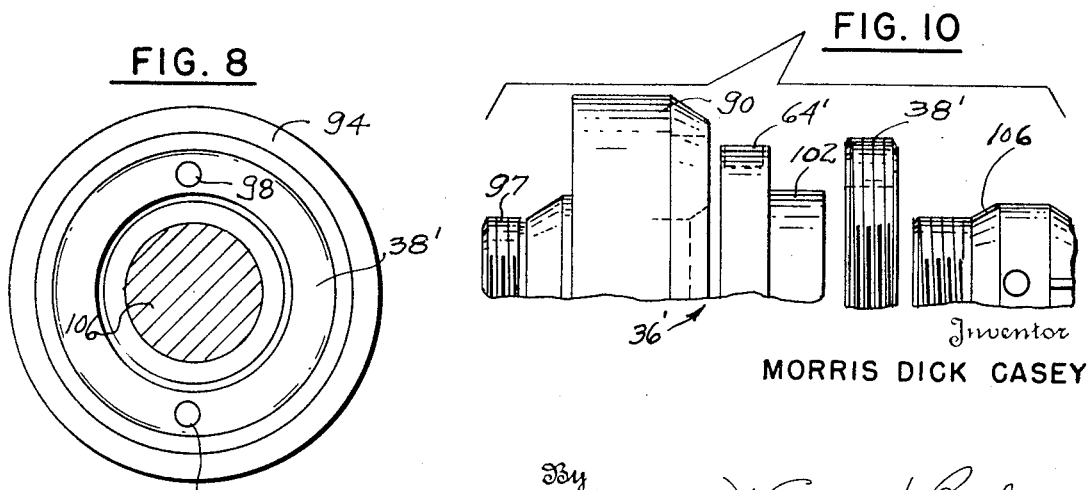
Inventor
MORRIS DICK CASEY
By
Olson, Trexler, Wolters & Bushnell
Attorneys

ADJUSTABLE CENTER APPARATUS

REFERENCE TO RELATED APPLICATION

The present application is a continuation-in-part of U.S. Pat. application Ser. No. 20,492, filed Mar. 18, 1970 now abandoned entitled, "Adjustable Live Center."

BACKGROUND OF THE INVENTION

This invention relates to the machine tool arts and more particularly to a novel lathe center adjustably adapted for correction of lathe and/or piece part center misalignment which may exist whenever a workpiece is supported thereby.

A lathe is employed for producing cylindrical, conical and flat surfaces, as well as for drilling and boring holes. Work is mounted between the headstock and the tailstock of the lathe and is revolved in conjunction with generally horizontally sliding cutting tools, the work rotation being provided by the headstock. When particularly accurate operations must be performed, the work is preferably supported between two lathe centers which act as bearings to align and support the workpiece. If the headstock center revolves eccentrically with respect to the longitudinal axis of the headstock spindle, or if a workpiece havng its surfaces eccentrically disposed with respect to the centers thereof is mounted between the lathe centers, then the workpiece will run out of true when revolved thereon. If it is desired to obtain perfect concentricity when machining work on lathe centers, it is necessary to correct for any apparent lathe or workpiece center misalignment.

To facilitate this correcion, many centers are conventionally supplied with means for adjustment thereof. However, the major disadvantage attending most of the conventional adjustable centers resides in their limiting any correction of center misalignment either to a direction horizontally of or vertically of the spindle axis. Thus, employment of such conventional adjustable centers with respect to a workpiece having its surfaces eccentric with respect to the centers thereof does not ensure correction for "run out" of the surfaces to the centers of the workpiece so that the periphery of the workpiece may be turned truly.

Accordingly, an important object of the present invention is to provide novel live or dead center adjustment means adapted for an extensive range of adjustments for correction of center misalignment.

Another object of the present invention is to provide an adjustable live or dead center which may be displaced transversely of the longitudinal axis of the rearwardly extending spindle in association therewith.

Still another object of the present invention is to provide an adjustable live or dead center which permits accurate, facile correction of any lathe center misalignment whenever it is desired to machine a workpiece having its surfaces eccentric with respect to the centers thereof.

These and other objects and features of the invention will become more apparent from a consideration of the following description.

DESCRIPTION OF THE DRAWINGS

FIG . 1 is a view taken in side elevation of a conventional lathe, showing the adjustable live center apparatus in accord with the invention;

FIG. 2 is an enlarged, fragmentary sectional view of the ajustable live center apparatus of FIG. 1, taken substantially along the line 2—2 of FIG. 3;

FIG. 3 is a view partially in elevation and partially in section of the adjustable live center apparatus of FIG. 1, taken substantially along the line 3—3 of FIG. 2;

FIG. 4 is an end view of the adjustable live center apparatus of FIG. 1, showing a plurality of ribs centrally radiating from a conical nose portion thereof;

FIG. 5 is a sectional view of the apparatus of FIG. 1, taken substantially along the line 5—5 of FIG. 2 and showing the ribs imbedded in a workpiece to be turned during various lathe operatior.s;

FIG. 6 is a sectional view of an adjustable center assembly of a modified form; the spindle construction to which this embodiment is to be connected, belng illustrated in phantom;

FIG. 7 is a sectional view taken along the line 7—7 of FIG. 6, in the direction indicated;

FIG. 8 is a sectional view taken along the line 8—8 of FIG. 6, in the direction indicated;

FIG. 9 is an elevational view of the adjustable center construction of FIG. 6 employed as a dead center in conjunction with a shank arrangement which is connectable with the tailstock of a lathe, the shank arrangement being illustrated in phantom; and FIG. 10 is a fragmentary, exploded view of the adjustable center of FIG. 6 illustrating the manner of assembly and disassembly.

DESCRIPTION OF THE ILLUSTRATED EMBODIMENT

Referring now in detail to the drawings, specifically to FIGS. 1–5, a first embodiment of the invention is illustrated. In this regard, there is shown in FIG. 1, a lathe, indicated generally by the reference character 10, which includes a headstock 12, a tailstock 14, a carriage (note shown) and a bed 16. The lathe bed 16 is generally a casting which functions to support and align the rest of the machine. The tailstock 14 slides along a set of ways (not shown) on the bed 16, the tailstock 14 includes a hollow spindle 18 (indicated in FIG. 1 in broken outline) which is propelled by a hand wheel 20. The spindle 18 contains a bore which may receive a lathe center, as described below.

Work rotation is provided by the headstock 12 having a generally horizontal spindle 24 which may be driven directly by a motor having a clutch provided in the gear train. The workpiece 26 must be attached to the headstock spindle 24 in order that it can be rotated properly for turning. To be accurate, the workpiece 26 must be correctly supported as it revolves. Thus, lathe centers are often used in pairs to support the workpiece, one center being placed in the tailstock spindle and the other being placed in the headstock spindle for revolution therewith, the points of the respective lathe centers, on which the workpiece rests, being fitted into a drilled and countersunk center or groove provided in each end of the workpiece. A driving connection is provided between the workpiece 26 and the rotating spindle 24 by means of a driving dog 28 generally used in conjunction with a driving face plate 30, the dog 28 gripping the periphery of the workpiece 26, as illustrated in FIG. 1.

If the center revolves eccentrically with respect to the longitudinal axis of the spindle 24, then the workpiece 26 will consequently run out of true when it is turned on the lathe centers. Similarly, a workpiece, having its surfaces eccentric with respect to the centers thereof, will run out of true, notwithstanding the lathe centers having been properly fitted in the grooves or center holes axially located centrally of each end of the workpiece.

As shown in FIG. 1, work supporting center apparatus or devices 32 are provided in conjunction with the headstock and the tailstock in accord with the instant invention. If desired, the adjustable center in the headstock can be replaced by an adjustable four-jaw chuck of known construction. The center apparatus 32 of FIGS. 1–5 is connectable with a tapered spindle 34, and includes flange means, a center assembly or arrangement 36 and a retainer ring 38 for mounting the center assembly 36 on the flange means, which is in turn affixed to spindle 34. Each adjustable center unit 32 is adapted for correcting "run-out" of the cylindrical surface of a workpiece with respect to the centers thereof, whereby to ensure truing the work between the lathe centers and further adapted for use in rotatably supporting the workpiece during lathe operations. Of course, there are also instances when the workpiece centers are to be purposely misaligned so as to permit truing of some desired portion, or to create a throw, or the like.

The center arrangement 36 includes a substantially cylindrical body portion 40 and a conically tapered nose portion 42 integral therewith. The body portion 40 has a circumferential outer wall 44 and a circumferential inner wall 46, the walls being spaced one from the other to define a web 48 therebetween. The body portion 40 further has a rearwardly opening, substantially centrally located blind cavity 50 therein, the cavity 50 being defined by the inner wall 46. The spindle 34 includes a flanged end segment having a forwardly extending, substantially cylindrical rod portion 52 integral therewith, the rod portion 52 being received by the cavity 50 to define a space 54 therebetween. The body portion 40 additionally includes two pair of opposing externally threaded setscrews. In the embodiment shown, a first pair of opposing setscrews 56 and 57 and a second pair of opposing setscrews 58 and 59 are illustrated (FIG. 3), the first pair 56 and 57 being generally vertically disposed and the second pair 58 and 59 being generally horizontally disposed.

Each of the setscrews 56, 57, 58 and 59 includes a shank portion (indicated, for example, in FIG. 3 as reference characters 60 and 61, with respect to respective setscrews 56 and 57), each shank portion being received in a correspondingly stationed, complementary, internally threaded, radially inwardly projecting channel (not numbered) which penetrates the outer wall 44, the web 48 and the inner wall 46 to open into the cavity 50. Advantageously, the setscrews 56, 57, 58 and 59 may be adjusted for entry within the space 54 and for withdrawal therefrom. Each pair of setscrews may thereby cooperate with the rod portion 52 to provide for displacement of the center assembly 36 to a desired position. Thus, for example, if it is desired that the center arrangement or assembly 36 be displaced a known distance downwardly, in order to correct for lathe center misalignment, the setscrew 56 will be withdrawn in a direction radially outwardly with respect to the center assembly 36. The setscrew 57 will be advanced in a direction radially inwardly with respect to the center arrangement or assembly 36 so that the shank portion 60 thereof will enter the space 54 to rest in abutting engagement with the rod portion 52. The length of the shank portion 60, to occupy the space 54 between the inner wall 46 and the surface of the rod portion 52, is equal to the desired distance through which the center assembly 36 is to be displaced. As will be appreciated, the setscrew 56 may then be advanced so that it also will rest in abutting engagement with the rod portion 52 whereby to lock the center assembly 36 in its new position. If it is desired to displace the center assembly 36 upwardly from a given position, the operation hereinabove described may be reversed, to wit: the setscrew 57 may be withdrawn radially outwardly with respect to the center assembly 36, and the shank portion 61 of the setscrew 56 may be advanced in a direction radially inwardly with respect to the center assembly 36 whereby to enter the space 54 and rest in abutting engagement with the corresponding surface of the rod portion 52. Similarly, the second pair of opposing setscrews 58 and 59 are adjustable for cooperation with the rod portion 52 whereby to regulate the displacement of the center assembly 36 to a new position horizontally of its resting position.

In compliance with an important feature of the invention, the first pair of opposing setscrews 56 and 57 and the second pair of opposing setscrews 58 and 59 are adjustably adapted for contemporaneous cooperation with the rod portion 52 whereby to regulate the displacement of the center assembly 36 from its resting or uncorrected position to a resultant corrected position transversely of the longitudinal axis of the spindle 34, i.e., the corrected position being intermediate the horizontally displaced and vertically displaced positions obtained when only one of the two pair of setscrews was operated. This feature of transverse displacement is of particular importance when a workpiece, having its surface eccentric with respect to the centers thereof is sought to be machined. It is this feature which is lacking in conventional adjustable live centers.

As hereinabove indicated, each of the setscrews includes a shank portion and further includes a recessed tool-engaging portion thereof (indicated, for example, in FIGS. 2 and 3 as reference character 62 with respect to setscrew 57), the tool-engaging portion being adapted to receive, for example, an Allen wrench insertable through holes 67 in retaining ring 38 so that the corresponding shank portion may either be withdrawn radially outwardly or be advanced radially inwardly, as the situation dictates. Each shank portion has a substantially planar or flattened anterior terminus (indicated, for example, in FIGS. 2 and 3 as reference character 63 with respect to the shank portion 60), to be received in abutting engagement with an appropriately positioned flattened notch or segment on the surface of the rod portion 52 (one of the flattened segments or "flats" being indicated in FIG. 3 by the reference character 65). As will be appreciated, the engagement of two substantially flattened portions, to wit: the flattened terminus of the shank portion of a setscrew upon a corresponding flattened surface of the rod portion, ensures the minimal amount of sliding with respect to the two surfaces whereby to secure or lock the center assembly in the desired position.

Continuing with reference to FIGS. 2 and 3, the body portion 40 of the center assembly 36 includes a radially outwardly extending collar portion 64 which is clamped to the radially extending flange 66 of the of setscrews 56', 57', 58' and 59' are carried by the annular, axially extending flange 95 and depend radially inward therefrom for engagement with the center assembly 36'. With reference to FIG. 7, it can be seen that the general disposition of said setscrews is similar to thatas discussed with regard to FIGS. 1–5. As such, operation of the center apparatus 32', to attain adjustment in the position of the center assembly 36', is identical to that previously discussed in detail. Accordingly, in order to avoid undue repetition, a detailed discussion of the operation of the embodiment of FIGS. 6–10 will not be given, it being understood that said operation is the same as discussed previously.

As was mentioned in the preceding paragraph, with the center apparatus 32' the respective setscrews 56'–59' are carried by the flange means with their shank portions engaged against the center assembly 36'. In the specific form illustrated in FIGS. 6–10, the center assembly 36' includes a collar portion 64' within which are formed a plurality of recesses 100. The disposition of the recesses 100 conforms to that of the setscrews 56'–59' so that said setscrews are received therein and engaged against the bottom walls of said recesses. As is visible from FIG. 7, the dimensions of the recesses 100 are such as to permit transverse movement of the center assembly 36 with respect to aligned pairs of setscrews, said movement being required upon operation of an opposite pair of setscrews.

Similar to the previously discussed embodiment of the invention, the center assembly or arrangement 36' includes a collar portion 64' which cooperates with a retainer ring 38' to maintain and fix the axial position of said assembly 36' with respect to the socket 96. However, in the modification under discussion, the retainer ring 38' is in the form of an externally threaded gland engaged with corresponding threads formed on the annular flange 94. As can be seen from FIG. 8, the retainer ring or gland 38' is provided with diametrically opposed sockets 98 which permit engagement therewith of a spanner wrench or some other tool so as to provide the necessary rotative movement upon assembly and disassembly. The manner of said assembly and disassembly of the center apparatus 32' is best understood with reference to FIG. 10 which illustrates this device in exploded fashion.

An additional feature of the embodiment under discussion is the provision of a two-piece center arrangement 36'. In this regard, said arrangement 36' includes an annular sleeve 102 upon which is formed the collar portion 64'. The sleeve 102 has an internally threaded bore 104 within which is mounted a nose member 106. The nose member 106 is thus removable and has the previously discussed nose portion 42' formed thereon. As such, when the nature of the workpiece dictates, the nose member 106 may be changed without disassembly of the entire center apparatus.

Certain of the advantages afforded by center apparatus 32' can be appreciated upon reference to FIG. 9, wherein said adjustable center apparatus 32' is employed as a dead or stationary center in conjunction with a shank arrangement 108 which is connected to the tailstock of a lathe (not shown), or the like. The center apparatus 32' can also be employed as a dead or stationary center in conjunction with the headstock of a lathe, using a nose member 106 with a plane nose portion 42'. The basic construction of the adjustable center apparatus 32', shown in FIG. 9, is identical to that illustrated in FIG. 6, except that the nose portion 106, having the raised ribs 82', has been replaced by a nose member having a plane nose portion. Primarily, this feature of interchangeability is provided by employment of the detachable connection between the flange member 90 and the spindle construction to be employed.

The embodiments of FIGS. 1–5 and 6–10 are illustrative of preferred forms of the present invention; however, it is envisioned that various changes in structure and design from that as specifically described, will no doubt occur to those skilled in the art. As such, these changes or modifications are to be understood as forming part of the present invention insofar as they fall within the spirit and scope of the claims appended hereto.

What is claimed is:

1. An adjustable center assembly for use with spindle apparatus of the type including a stationary shank and a sleeve mounted to said shank, said sleeve including a centrally disposed threaded aperture: said adjustable center assembly comprising; flange means including an externally threaded, axially extending end segment engageable with the threaded aperture of a spindle sleeve, and an axially facing socket disposed oppositely of said threaded end segment; a center arrangement mounted in said socket for movement relative to the axis of said flange means; and adjustable means carried by said flange means for engagement with said center arrangement to define the position thereof relative to said axis of said flange means; said center arrangement including an annular sleeve member having a centrally disposed threaded aperture and a nose member connected to said sleeve member and engageable with a workpiece, said nose member including an externally threaded end portion engaged with said threaded aperture of said sleeve and of similar dimension to the threaded end segment of the flange means such that said nose member may be employed as part of said center assembly or removed and engaged with the aperture of a spindle sleeve to provide a non-adjustable center.

2. An adjustable center assembly according to claim 1 wherein said adjustable means carried by said flange means includes a plurality of radially disposed setscrews having shank portions engaged against said center arrangement.

3. Adjustable center apparatus as defined in claim 1 wherein said nose member includes a conical portion adapted to be disposed in a corresponding aperture formed in a workpiece, and rib elements formed on said conical nose portion imbedable in said workpiece to provide secure engagement.

4. An adjustable center assembly as defined in claim 1 wherein said adjustable means includes first and second pairs of diametrically opposed setscrews, the respective pairs being disposed at right angles of each other, with each said setscrew having a shank portion for engagement with said center arrangement, and a plurality of recesses formed in said center arrangement and adapted to receive said setscrews therein, each said recess being larger than the external dimension of said setscrew thereby permitting relative movement of said center arrangement with respect thereto.

5. In combination, spindle apparatus of the type including a stationary shank and a sleeve mounted to said shank, said sleeve including a centrally disposed threaded aperture, and an adjustable center assembly flanged means associated with spindle 34 by the retainer ring 38 having a bore diameter 68 and a counter-bore diameter 70. As will be appreciated, the depth 72 of the counter-bore diameter 70 is slightly larger than the width of the collar portion 64 whereby to provide a clearance between the retainer ring 38 and the collar portion 64 to ensure a sliding fit therebetween. Clearance spaces 74 and 76 are also provided respectively between the body portion proper and the retainer ring 38 and between the collar portion 64 and the retainer ring 38 to ensure sufficient mobility of the center assembly 36 therein that it may be conveniently displaced to a desired position.

Continuing with reference to FIG. 2 and turning to a consideration of FIGS. 4 and 5, the nose portion 42 of the center assembly 36 is integral with the body portion 40; and it conically tapers to a point 78 which is preferably ground to an included angle of 60°. The point 78 is adapted to fit a groove or center hole 80 in one end of the workpiece 26, the center hole 80 comprising a plain drilled hole with a countersink following thereafter. The nose portion 42 further includes three raised ribs 82 which run along the surface thereof and which radiate outwardly from the point 78, the ribs terminating at the junction of the taper of the nose portion 42 with the body portion 40. In the embodiment shown, the ribs 82 radiate in directions such that they are equiangularly spaced. In other words, any two ribs 82 define therebetween an angle substantially equal to 120°. As indicated in FIG. 5, the ribs 82 function to imbed within the wall 84 surrounding the center hole or groove 80 of the workpiece 26 whereby to provide secure engagement of the center assembly 36 with the workpiece 26 during various lathe operations, while said workpiece 26 is supported on the conical surface of the nose portion 42. Preferably one of the ribs is marked with an indicia 85, such for example as the number "0." A workman can make a mark on the workpiece in alignment with the marked rib so that he can readily determine if any slippage takes place, or he can properly relocate the workpiece relative to the adjustable center, in the event he finds it necessary to remove the workpiece for any reason.

Continuing with reference to FIG. 2, the spindle 34 includes a rearwardly extending shank member 86 which is supported forwardly in roller bearings 88 and in ball bearings 90 and which is supported rearwardly in a sleeve bearing 92, the bearings being fitted to the shank member 86, whereby to reduce the amount of power absorbed in turning the spindle 34 and to allow higher spindle speeds to be used without the problem of overheating. The shank member 86 is enclosured by a housing portion 94, the shank member and the housing portion both being tapered rearwardly for fitted assembly with the tapered bore of the mouth of a conventional spindle. Inasmuch as the tapered bore of a conventional spindle would probably be larger than the tapered, rearwardly extending housing portion 94, a tapered sleeve would generally be placed in the bore of the mouth and then the adjustable live center apparatus 32 would be placed in the sleeve.

Thus, the embodiment of FIGS. 1-5 is adapted for use in rotatably supporting a workpiece during various lathe operations and further permits precise and true alignment from headstock to tailstock. The adjustable setscrews, in cooperation with the rod portion 52, permits accurate correction relatively quickly of any lathe or piece part center misalignment which may result whenever it is desired to machine a workpiece having its surfaces eccentric with respect to the centers thereof. Furthermore, the adjustable live center of the instant invention is adapted to provide an extensive range of adjustments for correction of center misalignment, providing not only for correction of center misalignment in the vertical direction, but additionally providing for such correction in the horizontal direction, or in a direction intermediate the two, i.e., a direction transverse of the longitudinal axis of the spindle. The instant invention additionally is adapted for use with a conventional lathe.

In FIGS. 6-10, an alternate form or embodiment of the present invention is shown. The basic operation and general construction of the center apparatus of this embodiment is substantially similar to that discussed with regard to FIGS. 1-5. Accordingly, those features or elements identical to or corresponding to those previously discussed will be identified by like reference characters primed (').

At the outset, it should be noted that this embodiment includes certain features not discussed with regard to that of FIGS. 1-5; however, it is intended that the various constructional features of both embodiment are interchangeable wherever possible. For example, in FIGS. 6-10, the center assembly, designated generally 36', is adapted for releasable connection to the remainder of the center apparatus 32'. Accordingly, it is to be understood that this expedient may be employed in place of the one-piece arrangement shown in FIG. 2. Also, the center assembly or arrangement 36' of this embodiment includes an interchangeable nose member, which feature may be utilized with the center apparatus 32 of FIGS. 1-5, if desired.

Directing attention now to FIG. 6, the center apparatus 32' comprises a stationary shank 86' to which a bearing housing 94' is rotatably mounted by a bearing arrangement 88', the center assembly 36' being releasably connected to said housing 94' as illustrated. Accordingly, said center assembly 36' and housing 94' are connected for joint rotation relative to shank 86', constituting said center of FIG. 6, a live center. Further, the center assembly 36' includes flange means in the form of a flange member 91 comprised of a radially disposed flange section 93 and an annular, axially extending flange portion 95. Respective flange portions 93 and 95 define a socket 96 within which is disposed a center assembly or arrangement 36'. In this regard, the dimensions of the socket 96 are such that the center assembly 36' is free for limited movement transversely of the longitudinal axis of the flange member 91. In addition, the flange member 91 also includes a threaded end or rear segment 97 which adaptes said member for releasable connection to the housing 94' which is joined to shank 86', which in turn may be connected to the spindle assembly of the tailstock or the headstock.

It is the above-mentioned dimensional difference between the socket 96 and the center assembly 36' which provides for the adjustment in the position of the workpiece engaging nose portion 4'. In fact, as will be understood from the explanation to follow, this construction, along with certain modifications in the placement of the adjustment means, obviate the need for the rod element 52 and socket 50 of the previously discussed embodiment of FIGS. 1-5. More specifically, with the present embodiment, the adjustment means in the form connected to said sleeve, said center assembly comprising: flange means including an externally threaded, axially extending end segment engageable with the threaded aperture of a spindle sleeve, and an axially facing socket disposed oppositely of said threaded end segment; a center arrangement mounted in said socket for movement relative to the axis of said flange means; and adjustable means carried by said flange means for engagement with said center arrangement to define the position thereof relative to said axis of said flange means; said center arrangement including an annular sleeve member having a centrally disposed threaded aperture and a nose member connected to said sleeve member and engageable with a workpiece, said nose member including an externally threaded end portion engaged with said threaded aperture of said sleeve and of similar dimension to the threaded end segment of the flange means such that said nose member may be employed with said center assembly or engaged with the aperture of a spindle sleeve to provide a non-adjustable center.

6. An adjustable center assembly according to claim 5 wherein said adjustable means carried by said flange means includes a plurality of radially disposed set-screws having shank portions engaged against said center arrangement.

7. An adjustable center assembly as defined in claim 5 wherein said annular sleeve member includes a radially disposed collar portion, and a retainer ring member engageable with said collar portion and joined to said flange means, to retain said center arrangement in said socket.

8. Adjustable center apparatus as defined in claim 5 wherein said nose member includes a conical portion adapted to be disposed in a corresponding aperture formed in a workpiece, and rib elements formed on said conical nose portion imbedable in said workpiece to provide secure engagement.

9. Adjustable center appratus for use with a lathe, or the like, and comprising; flange means having an axially opening socket, with a coaxially extending rod means disposed in said socket; a center arrangement disposed in said socket for movement relative to the axis of said flange means and including a nose portion for engagement with a workpiece; and retaining means for maintaining said center arrangement in said socket; said center arrangement including a coaxial blind cavity disposed oppositely of said nose portion within which said rod element is received, the relative dimensions of said cavity and said rod element defining the limits of movement of said center arrangement relative to the axis of said flange means; and selectively operable adjustable means carried by said center arrangement and engaged with the rod element to define the position of said center arrangement with respect to said rod element and thereby with respect to the axis of said flange means.

10. Adjustable center apparatus for use with a lathe, or the like, and comprising; flange means including an axially opening socket, a center arrangement disposed in said socket and including a nose portion for engagement with a workpiece, retaining means mounting said center arrangement in said socket for movement transversely of the longitudinal axis of said flange means, and selectively operable adjustment means engaged with said flange means and said center arrangement for defining the relative position of said center arrangement with respect to said longitudinal axis, said nose portion including a conical section having rib elements formed thereon and adapted for disposition in a corresponding aperture formed in a workpiece, with said rib elements embedding in said workpiece to maintain the relative position of said workpiece with respect to said nose portion.

11. Adjustable center appratus as defined in claim 10 wherein said flange means includes an axially extending rod element 65, said center arrangement including a centrally disposed blind cavity within which said rod element is received to define an adjustment space, and said adjustment means including elements carried by said center arrangement and engaged with the rod element to define the relative position of said center arrangement with respect to said rod element.

12. An adjustable center apparatus as defined in claim 10 wherein said flange means includes a socket defined by an axially extending annular flange member, said center arrangement being disposed in said socket with said annular flange in overlapping relation thereto, and said adjustable means including means carried by said annular flange member and engaged with said center arrangement to define the relative position of said center arrangement wth respect to the longitudinal axis of said flange means.

* * * * *